(12) United States Patent
Kuo

(10) Patent No.: US 7,822,691 B1
(45) Date of Patent: Oct. 26, 2010

(54) METHOD FOR DETERMINING HOUSE PRICES INDICES

(75) Inventor: Chionglong Kuo, Arlington, VA (US)

(73) Assignee: Fannie Mae, Washington, DC (US)

(*) Notice: Subject to any disclaimer, the term of this patent is extended or adjusted under 35 U.S.C. 154(b) by 2042 days.

(21) Appl. No.: 10/328,172

(22) Filed: Dec. 26, 2002

Related U.S. Application Data

(60) Provisional application No. 60/342,845, filed on Dec. 28, 2001.

(51) Int. Cl.
*G06Q 50/00* (2006.01)
(52) U.S. Cl. ...................................... 705/313
(58) Field of Classification Search ........................ 705/1
See application file for complete search history.

(56) References Cited

U.S. PATENT DOCUMENTS

| | | | |
|---|---|---|---|
| 5,361,201 A | | 11/1994 | Jost et al. |
| 5,675,553 A | * | 10/1997 | O'Brien et al. ............. 367/135 |
| 5,893,069 A | | 4/1999 | White, Jr. |
| 6,401,070 B1 | | 6/2002 | McManus et al. |
| 6,510,419 B1 | | 6/2002 | Gatto |
| 6,609,109 B1 | | 8/2003 | Bradley et al. |
| 6,609,118 B1 | | 8/2003 | Khedkar et al. |
| 6,681,211 B1 | | 1/2004 | Gatto |
| 6,842,738 B1 | | 1/2005 | Bradley et al. |
| 6,876,955 B1 | | 4/2005 | Fleming et al. |
| 7,292,790 B1 | * | 11/2007 | Sardesai ...................... 398/148 |
| 7,366,679 B2 | * | 4/2008 | Yuyama et al. ............... 705/10 |
| 2002/0059126 A1 | | 5/2002 | Ricciardi |

(Continued)

OTHER PUBLICATIONS

Kuo, Chionglong. "A bayesian approach to the construction and comparision of alternative house price indices," Journal of Real Estate Finance and Economics, 1997, 14: 113-132.*

(Continued)

*Primary Examiner*—John G Weiss
*Assistant Examiner*—Vern Cumarasegaran
(74) *Attorney, Agent, or Firm*—Rader, Fishman & Grauer PLLC

(57) ABSTRACT

A method for estimating a real estate price index based on a repeat sales model. The method includes the steps of eliminating corrupt portions of data used to determine price indices; regressing a difference in a log price of a second sale minus a log price of a first sale for a property on a set of dummy variables, eliminating the observations with zero residuals for estimating the dispersion function; using a quadratic formula to model a dispersion of residual values with respect to time interval; using the quadratic formula to solve for a dispersion for each time interval starting with a minimum positive value; determining a minimum dispersion value that is a value calculated from the quadratic formula; determining a maximum dispersion value that is calculated from the quadratic formula for each time interval starting with a minimum positive value, wherein the dispersion values are prevented from decreasing with increasing time intervals; repeating the step of regressing using the inverse of the square root of fitted values from the quadratic formula as weights; identifying and selecting the time periods and associated data for estimating a price index that covers a particular time period; excluding the index values which are determined to be unreliable; and obtaining an index series for a lower geographic level by using the index series of a higher geographic level.

20 Claims, 7 Drawing Sheets

U.S. PATENT DOCUMENTS

| | | | |
|---|---|---|---|
| 2003/0046199 | A1 | 3/2003 | Murase et al. |
| 2003/0078878 | A1 | 4/2003 | Opsahl-Ong |
| 2004/0010443 | A1 | 1/2004 | May et al. |

OTHER PUBLICATIONS

Englund, Peter, John M. Quigley, and Christian L. Redfearn. (1999). "The choice of methodology for computing housing price indexes: comparisons of temporal aggregation and sample definition," Journal of Real Estate Finance and Economics, 19:2, 91-112.*

Meese, Richard A., and Nancy F. Wallace. (1997). "The construction of residential housing price indices: a comparision of repeat-sales, hedonic-regression, and hybrid approaches," Journal of Real Estate Finance and Economics 14(1 & 2), 51-74.*

Andrews, R.L.& Ferguson,J.T., "Integrating Judgement with Regression Appraisal",*Real Estate Appraiser and Analyst*, Spring 1986, pp. 71-74.

Case, B. & Quigley, J.M., "The Dynamics of Real Estate Prices", *Rev. of Econ. & Stats.*, Feb. 1991, 73(1), pp. 50-58.

Case, K.E. & Shiller, R.J., "Forecasting Prices and Excess Returns in the Housing Market", *J. of the Areuea*, 1990, 18(3), pp. 253-273.

Pace, R.K. & Gilley, O.W., "Appraisal Across Jurisdictions Using Bayesian Estatemation with Bootstrapped Priors for Secondary Mortgage Market Applications", *Prop. Tax J.* Mar. 1989, 8 (1), pp. 27-42.

Quigley, J.M., "A Simple Hybrid Model for Estimating Real Estate Price Indexes", *J. Houseing Econ.*, Mar. 1995,4 (1), pp. 1-12.

Raftery, A. et al., "Model Selection and Accounting for Model Uncertainty in Linear Regression Models", Nov. 19, 1993, U of Washington, pp. 1-24.

Sessions, D.N. & Chatterjee, S., "The Combining of Forecasts Using Recrursive Tecniques With Non-Stationary Weights", *J. of Forecasts*, 1989, 8(3), pp. 239-251.

Archer, W.R. et al., "Measuring the Importance of Location in House Price Appreciation", *J. of Urban Economics*,vol. 40, 1996, pp. 334-353.

Case, K.E. & Shiller, R.J., "Prices of Single-Family Homes Since 1970:New Indexes for Four Cities", New England Economic Review, Sep./Oct. 1987, pp. 45-46.

Case, K.E. & Shiller, R.J., "The Efficiency of the Market for Single-Family Homes", The American Economic Review, vol. 79(1), Mar. 1989,pp. 125-137.

Stephens, W. et al. "Conventional Mortgage Home Price Index", J. of Housing Research, vol. 6(3),pp. 389-418.

Vandell, K.D., "Optimal Comparable Selection and Weighting in Real Property Valuation", Areuea Journal, vol. 19(2), 1991, pp. 213-239.

Case et al., "On Choosing Among House Price Index Methodologies", Journal of the American Real Estate & Urban Economics Association, vol. 19, No. 3,1991, pp. 286-307.

Abraham et al., "New Evidence on Home Prices from Freddie Mac Repeat Sales". Journal of the American Real Estate & Urban Economics Association, Fall 1991, vol. 19, Issue 3, pp. 333-352.

Steven Wood "Combining Forecasts to Predict Property Values for Single-Family Residences" Land Economics, May 1976, pp. 221-229.

George W. Gau et al., "Optimal Comparable Selection and Weighting in Real Property Valuation: An Extension" (Journal of the American Real Estate and Urban Economics Association 1992, V20, 1: pp. 107-123.

* cited by examiner

|  | First data set | Second data set |
|---|---|---|
| Total observations before exclusion | 17,583,192 | 12,103,264 |
| Observations before exclusion with non-missing prediction gap | 17,063,588 | 11,420,676 |
| Total observations after exclusion | 17,396,620 | 11,977,721 |
| Observations excluded | 186,572 | 125,543 |

Fig. 3

|  | First data set | | Second data set | |
| --- | --- | --- | --- | --- |
|  | Included sample | Excluded sample | Included sample | Excluded sample |
| Mean *gapPct* | 1.2% | 73.9% | 0.9% | 25.3% |
| Std of *gapPct* | 15.7% | 171.9% | 12.2% | 85.5% |
| Min *gapPct* | -64% | -98.9% | -43.8% | -97.2% |
| Max *gapPct* | 215% | 3337% | 88% | 1741.7% |
| Mean $\ln(p/\hat{p})$ | 0.0009 | 0.03 | 0.0019 | 0.019 |
| Std of $\ln(p/\hat{p})$ | 0.147 | 1.09 | 0.118 | 0.65 |

Fig. 4

| Time Period | Zip Index | County Index | MSA Index |
|---|---|---|---|
| 1 | . | 80 | 100 |
| 2 | . | . | . |
| 3 | . | 100 | 150 |
| 4 | 150 | 120 | 200 |
| 5 | . | . | 240 |
| 6 | . | 150 | 260 |
| 7 | 250 | 200 | 300 |

Fig. 6

| Time Period | Zip Index | County Index | MSA Index |
|---|---|---|---|
| 1 | 100 | 80 | 100 |
| 2 | . | . | . |
| 3 | 125 | 100 | 150 |
| 4 | 150 | 120 | 200 |
| 5 | 176.54 | 141.23 | 240 |
| 6 | 187.5 | 150 | 260 |
| 7 | 250 | 200 | 300 |

Fig. 7

METHOD FOR DETERMINING HOUSE PRICES INDICES

This application claims the benefit of U.S. Provisional Application No. 60/342,845, filed on Dec. 28, 2001, hereby incorporated by reference.

FIELD OF THE INVENTION

The present invention relates to a method and apparatus for determining a real estate price index associated with properties in a real estate market by using a repeat sales model.

BACKGROUND OF THE INVENTION

Repeat sales index models use actual sales prices and time data points to estimate a market-level home price index. Home price index is one of the most important factors in understanding the housing market trends and activities. The present value of a property may be estimated from the price index using the prior sale information. One repeat sales model proposed by Bailey, Muth, and Nourse (the BMN model) specifies that the change in the logarithm price of a property over a known period of time is equal to the change in the logarithmic price index plus an error term. Another repeat sales model by Case and Shiller (the Case-Shiller model) improves the BMN method. Unlike the BMN model that assumes that the error term is independent, the Case-Shiller model assumes that the variance of the error term is a linear function of the time between sales. Case-Shiller (1987) proposed a three-step procedure to estimate their model. In their first step, an OLS is run by regressing log price difference on a set of time dummies. In the second step, the square of the residual of the first step is regressed on a constant term and a variable for the time interval between sales. In the third step, the predicted dependent variable in the second step is used as weights to re-run the first step regression. As a generalization of the Case-Shiller model, researchers have proposed a quadratic-dispersion model that assumes the variance of the error term is a quadratic function of the time between sales of the property.

The quadratic dispersion index model is also estimated by a three-step procedure similar to the Case-Shiller procedure. The difference is in the second step, where the squared residual from the first step is regressed on a constant term, a transaction time interval and a squared transaction time interval. From an economic perspective, it is expected that the cross-sectional dispersion of residual value is positive and non-decreasing with increasing time interval. However, the application of real world data to the quadratic equation may yield a constant term that is negative, which often results in a prediction of negative dispersion when the time interval is short. In addition, the dispersion of the residual values predicted by the quadratic model is likely to decrease when the interval between sales is long. Since the occurrence of negative dispersion and the decreasing dispersion of residual values with increasing sales intervals run contrary to economic reasoning, the prediction by the quadratic model without a modification will produce unusable and inaccurate estimate of the dispersion.

Moreover, the three-stage method of calculating price indices for properties in a particular region is often carried out using data corresponding to thousands, and sometimes millions, of property sales. For each property, there is data that indicate both the prices and the time interval between sales of the property. These large sets of data inevitably contain some inaccurate values and some data that do not reflect market trends due to factors such as non-arms-length transactions and changes of building attributes. It has been determined that faulty data is most likely to reveal itself as outlying data when compared with the entire data set. The inclusion of outlying data in a data set used to calculate the price indices may undesirably skew the determined price index values. Accordingly, to improve the accuracy of price indices determination, a method is needed to systematically eliminate the data that is most likely to be corrupt from the determination process.

Often there is insufficient data to estimate a complete series of index covering the entire time periods continuously. Obviously, the index value for the time periods for which no data are available can not be estimated. A less Obviously scenario is that a complete series index may not be estimated even when there are data in all the time periods. When the index value for a time period can be estimated, either in a complete or incomplete series, the index value may not necessarily be reliable. For example, an index value for a time period estimated by only a few observations is not a good representation of an MSA-level index for that time period. Accordingly, there is a need for determining the time periods and the associated data that bear on the determination of price index that includes a particular time period. There is also a need for determining a complete and reliable price index for situations when there is insufficient data such that the indices for some time periods either cannot be estimated or are unreliable.

SUMMARY OF THE INVENTION

The present invention relates to a method for estimating a real estate price index based on a repeat sales model. The method includes the steps of eliminating corrupt portions of data used to determining price indices; regressing the difference in the log price of a second sale minus the log price of a first sale for a property on a set of dummy variables; eliminating the observations of zero residuals for the estimation of the dispersion function; using a quadratic formula to model and estimate a dispersion of residual values with respect to time interval; determining a minimum dispersion value calculated from the quadratic formula to modify the predicted negative dispersion; determining a maximum dispersion value calculated from the quadratic formula to modify the decreasing dispersion so that the dispersion values are prevented from decreasing with increasing time intervals; repeating the first-stage regression using the inverse of the square root of fitted values from the quadratic formula as weights; and obtaining an index series for a lower geographic level by using the index series of a higher geographic level.

The invention also relates to a method for identifying and selecting the time periods and data for estimating a price index that covers a particular time period, by initializing a T×T matrix Z with zeros, wherein each element of Z has a row and column coordinate of (k, l); using each row and column coordinate to represent a sales time period, wherein each (k, l) element of Z indicates if a property was sold during both period k and period l; storing a one at each (k, l) element of Z if at least one property is sold during both period k and period l; selecting the particular time period, T, for which price index is to be estimated; identifying each (k, l) element of the $T^{th}$ column that is equal to one; selecting sales data for all periods that correspond to the identified elements of the column being examined; examining each as of yet unconsidered column that corresponding to a period identified during the step of identifying each element; and repeating the steps of selecting sales data and examining each as of yet unconsidered column for each newly identified period until all identified periods are examined.

The invention also relates to a method for obtaining an index series for a lower geographic level by using the index series of a higher geographic level. The method includes the steps of establishing an exclusion criterion to exclude periods for which indices are deemed unreliable; developing a frequency measure and a standard error measure combination to determine if an index estimate should be excluded; and filling in price indices predicted for a geographic region for a corresponding relatively smaller geographic area.

Additional features and advantages of the invention will be set forth in the description that follows, and in part will be apparent from the description, or may be learned by practice of the invention. The objectives and advantages of the invention will be realized and attained by the system and method particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings:

FIG. 3 illustrates results obtained from applying model-based exclusion rules to a set of data;

FIG. 4 illustrates a comparison of the characteristics of a first and second data set;

FIG. 6 illustrates an example of how price indices can be filled in for an assumed two index series for that same duration; and FIG. 7 illustrates indices obtained from a filling in process.

DESCRIPTION OF THE PREFERRED EMBODIMENTS

Reference will now be made in detail to the preferred embodiments of the present invention, examples of which are illustrated in the accompanying drawing. The present invention described below extends the functionality of the inventive system and method for estimating a real estate price index based on a repeat sales model.

Figure 1:
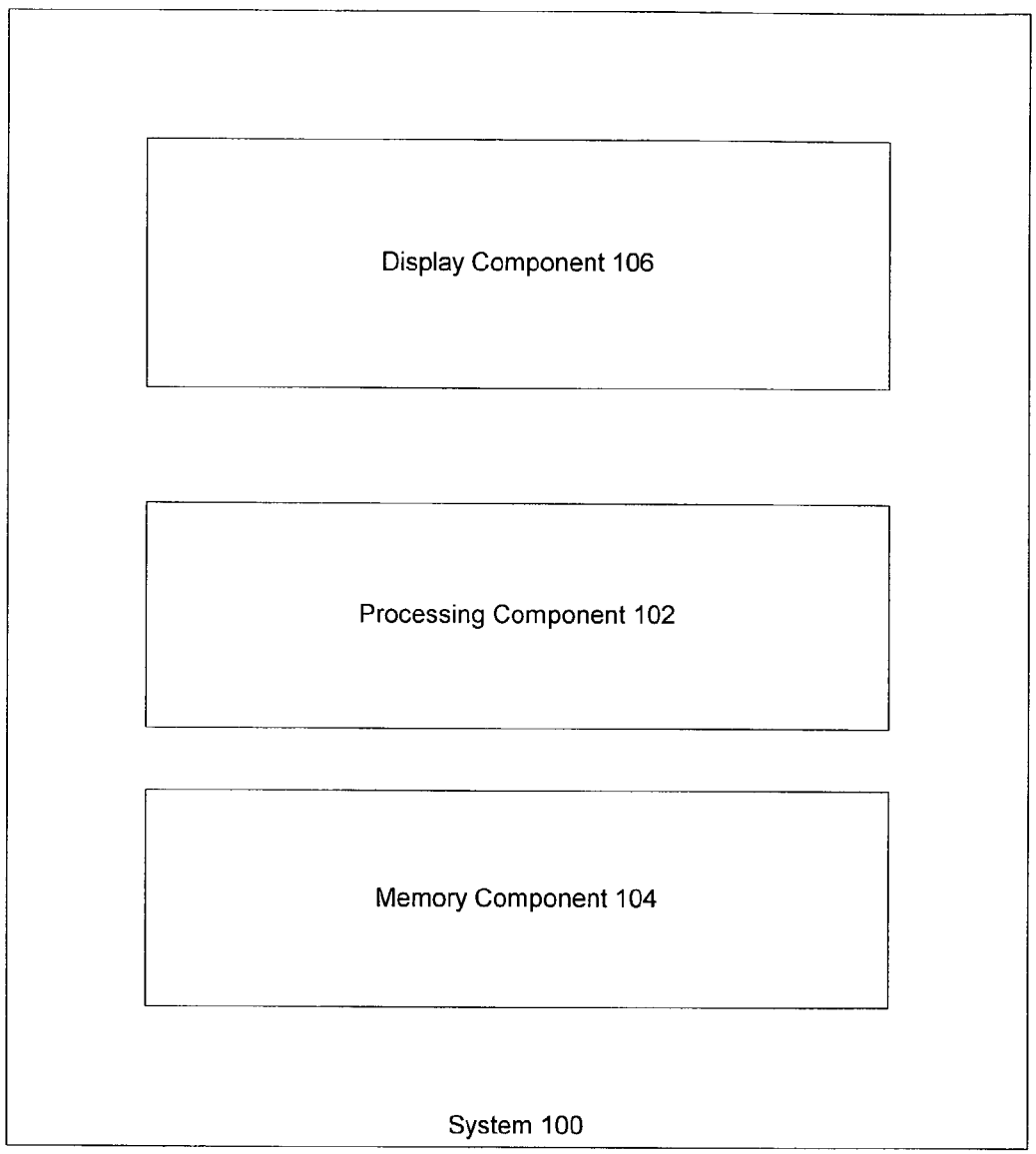
FIG. 1 illustrates a computer system that is configured to facilitate in determining a real estate price index for a real estate market based on repeat sales data.

FIG. 1 illustrates a computer system 100 that is configured to facilitate in determining a real estate price index for a real estate market based on a repeat sales model. Computer system 100 comprises a processor 102, a memory component 104 and a display component 106. Processor 102 is configured to execute a three-stage regression procedure to determine and report estimates of real estate price indices in a given market. An embodiment of the present invention is based on matrix operations that may be implemented on processor 102 using a matrix programming language, such as SAS IML, GAUSS, or MATLAB. It is apparent to one skilled in the art that different computer programs and languages may be used in the inventive system. Memory component 104 is capable of storing sales data relating to a plurality of properties, wherein the data for each property includes at least two sales prices over a period of time. Upon obtaining data related to the plurality of properties from memory component 104, processor 102 may load the data in matrices, wherein a first sale price for each property is denoted as $p_1$, a second or resale price is denoted as $p_2$, a first sale time period is denoted as $t_1$, and a second or resale time period is denoted as $t_2$. Upon determining the price indices, processor 102 communicates the indices to a user through display component 106 or other display means.

The present invention uses a three-stage quadratic dispersion model. The first stage of a preferred embodiment of the present invention corresponds to the BMN Model or the first stage of a conventional Case-Shiller type method. The Case-Shiller method requires that the log price of the second sale minus the log price of the first sale for the same property be regressed on a set of dummy variables, each representing a time period with the exception of the base period. The purpose of the first stage regression is to calculate a residual for each property in the geographic area under consideration.

In the second stage, the squares of the residuals calculated from the first stage are regressed on a constant term, the time between sales (the holding period), and the square of the holding period. The square of the residuals from the first stage regression, hereafter termed 'dispersion', can be viewed as the variance of the growth rate deviation of an individual property from the market. The invention modifies the second stage quadratic dispersion index modeling for predicting the dispersion which includes the Case-Shiller model and BMN model as special cases. In a preferred embodiment of the invention, the quadratic formula in Equation 1 may be used to model the dispersion of the residual values with respect to time interval.

$$e_{i,d}^2 = A + B \cdot d + C \cdot d^2 + u_i \qquad \text{Equation 1:}$$

where $e_{i,d}$ is the residual from the first-stage regression (i.e. the difference between the actual growth rate and the predicted growth rate) for the $i^{th}$ observation with sale interval d. The dependent variable in Equation 1 is the cross section dispersion of individual property's growth rate. With the knowledge of the first-stage residuals $e_{i,d}$ and the associated time intervals, Equation 1 may be solved for a set of values for A, B, and C such that the sum of the squares of the estimated residuals is minimized. These values may then be substituted into Equation 1 to obtain a predicted value for the dispersion of a given sales interval.

Figure 2:
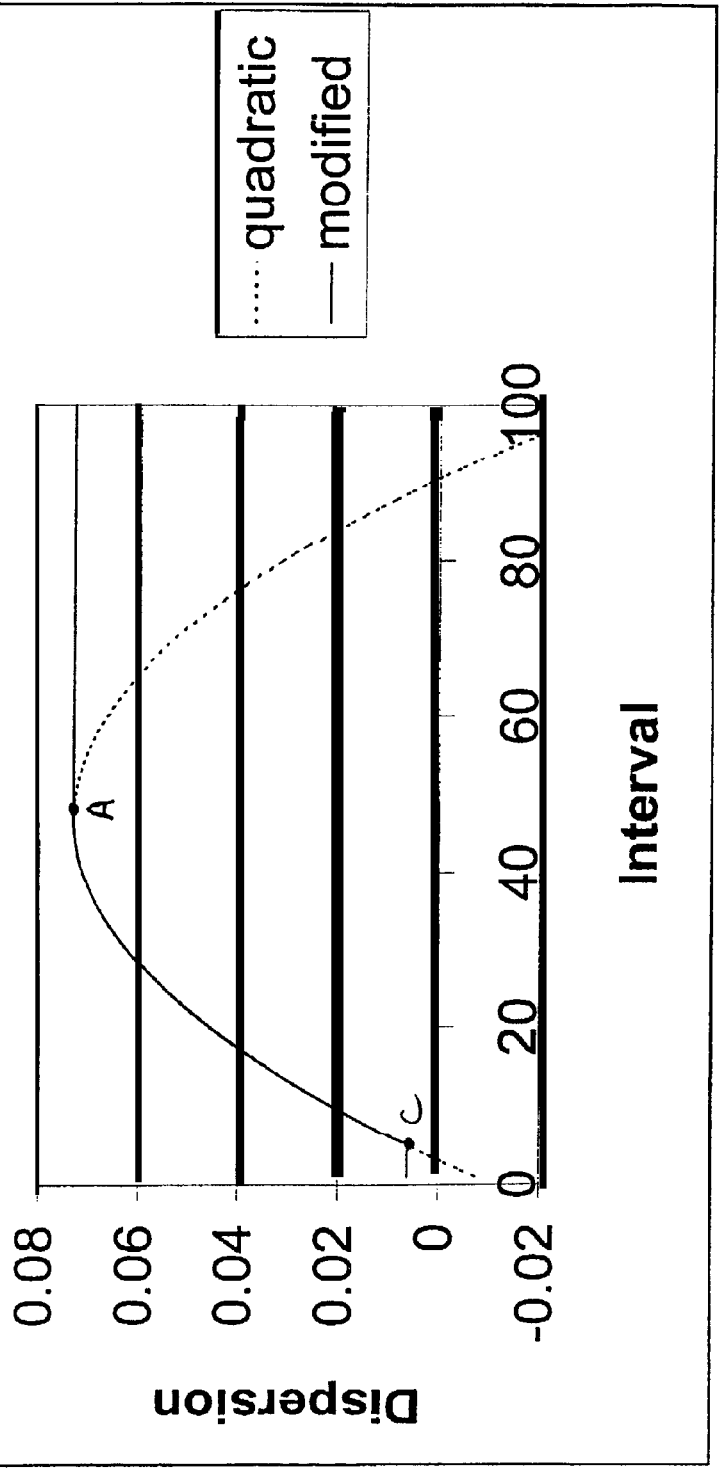
FIG. 2 illustrates an example plot of the dispersion of residual values versus time interval.

FIG. 2 illustrates an example plot of the fitted dispersion of residual values versus time interval based on a quadratic dispersion model. Examination of the plot resulting from the currently used quadratic model shows that the fitted dispersion decreases at values greater than point A. The plot resulting from the quadratic model also indicates that dispersion is less than zero for intervals less than that corresponding to point C. In the new inventive system, we create modified dispersion to replace the originally fitted dispersion. In FIG. 2, the modified dispersion is limited from dropping below zero (0) for interval values less than that of point C and kept constant after the interval point A.

According to the invention, the minimum dispersion value (i.e. the value at point C) may be determined by setting the minimum dispersion value to equal one-half of the second positive dispersion value that is calculated using the unmodified quadratic model. In other words, the quadratic equation is used to solve for dispersion $\hat{e}_{i,d}^2$ for each time interval d starting with d=1. As the interval d is increased, there is a point at which dispersion $\hat{e}_{i,d}^2$ is calculated to be a positive value for the second time. One-half of this positive value is used as the minimum dispersion value. In another embodiment of the invention, the minimum dispersion value may be set to equal the second positive dispersion value calculated using the unmodified quadratic model, as opposed to one-half of the second positive dispersion value.

Hence, the particular value selected for the minimum dispersion value may be any positive value without departing from the intended scope of the invention. The second dispersion value that is calculated to be positive (or half thereof) is selected in the foregoing embodiment so as to select a low value that is assured to be more than a very small amount greater than zero. For example, a first calculated positive dispersion value could be 0.0001, which would provide a smaller than desired value. This may occur if the dispersion only becomes positive at the very end of the interval under consideration. By selecting the second positive value, we ensure that the dispersion will not be unreasonable small. Selection of one-half of the second positive value of the dispersion will ensure the dispersion increases with time interval.

The dispersion is also limited from decreasing for interval values greater than that of point A in FIG. 2. For all interval values greater than point A, the dispersion value is held constant at the maximum value it attained at point A.

The maximum dispersion value may be determined using Equation 1 to solve for dispersion $e_i^2$ for each time interval (t−s) starting with (t−s)=1. As the interval (t−s) is increased, there is a point at which the newly calculated dispersion $e_i$ is less than the previously calculated dispersion value. This is the point of "decreasing" dispersion. The maximum dispersion value may be selected by comparing each succeeding dispersion value with the value immediately preceding it. When any newly calculated dispersion value is found to be less than the previously calculated value, the new dispersion value is set equal to the previous value. Following this formula the dispersion values are prevented from decreasing with increasing time interval.

When estimating the second stage regression as described in Equation 1, the conventional methods use all the observations in the data sample. In the inventive system, we exclude those observations that have zero residuals in the first-stage regression due to limited data availability. Conceptually, if there is only one observation to determine the market growth rate between two time periods, then the first-stage residual for that observation will be zero as the best estimate of the market growth rate equals the growth rate associated with the observation. If there are multiple observations relevant for determining the growth rates between two time periods, it is possible that some observations may have zero residuals. For the purpose of estimating the second stage index model (i.e., the dispersion function), it is necessary to exclude the observations with zero residuals due to the uniqueness of the observation for determining the market growth rate. However, not all the zero residuals should be excluded from the estimation of the dispersion model. The zero residuals in the presence of multiple observations in determining the market growth rate should still be used in the estimation of the dispersion model. The joint conditions for identifying the zero residuals caused by single observation problem are:

1. The first-stage regression residual is zero.
2. There is one and only one observation for the pair of sale and resale time points.
3. The $t_1$ diagonal element of the inverse of the frequency matrix F with the $t_2$ row and $t_2$ column excluded equal one.

The off-diagonal element of the frequency matrix F is the negative of the pairs of transactions occurring in the corresponding sale and resale time period. The diagonal element of the frequency matrix F is the number f transactions occurring in the corresponding time period. The frequency matrix F can be constructed according to the steps outlined below.

It is ideal to exclude observations that satisfy all the three above conditions. In practical implementation, it is probably feasible to apply only condition 1 or only condition 1 and 2 together as the occurrence of zero residuals in the presence of multiple observations in determining the growth rates between two time periods is expected to be a low-probability event.

In the third stage, the first stage regression is repeated using the inverse of the square root of fitted values from the second stage as weights, i.e., each observation is first divided by the square root of the fitted value and an ordinary least squares (OLS) regression is performed. Completion of the three-stage procedure enables one to estimate a series of indices. The indices can then be used to conduct analysis of the market trend or to predict the present value for a property when the original sale price and sales time are known.

The inventive system also provides a method for eliminating portions of the data used to determine price indices that are likely to be corrupt. In one embodiment, a non-model based approach may be employed to eliminate outlying data before estimating a repeat sales index. In this embodiment, a property is excluded from the sample used to estimate house price index if any of the following criteria are met:

1. if the indexed sale price is lower than a pre-selected minimum price or greater than a pre-selected maximum price; or
2. if the quarterly growth rate is greater than a pre-selected maximum percentage or lower than a pre-selected minimum percentage for each duration between sales. The threshold of the pre-selected minimum and maximum prices and growth rate can be selected based on the data distribution or prior knowledge of the market.

The data may be tested for the foregoing criteria using current computer programs. Data that tests positive for any of the criteria is excluded from inclusion in the price indices determination process. It is apparent to one skilled in the art that the particular values and percentages employed in the non-model based exclusion method may vary upward or downward without departing from the intended scope of this aspect of the invention.

In another embodiment of the invention, a model-based process may be employed to eliminate the outlying data. For the model-based approach, it is assumed that a data value (observation) is an outlying data if the prediction gap is at the tail ends of the gap distribution. The prediction gap for property i is defined as:

$$gapPct_i = 100 * \left(\frac{p_i}{\hat{p}_i} - 1\right)$$ Equation 2 where $p_i$ is the sale price and is the property value predicted using the estimated zip code or county level index.

In the model-based embodiment, the position of each property in a prediction gap distribution of a corresponding small geographic area, for example a zip code, and the position of each property in the gap distribution for the entire sample is determined. If an observation has a prediction gap at the tail ends of its small geographic area gap distribution and also at less extreme tail ends of the gap distribution of the entire sample, the observation is excluded from the estimation sample. If an observation's prediction gap is not at the tail ends of the small geographic area gap distribution, but is at a far tail end of the entire sample's gap distribution, the observation is also excluded from the estimation sample.

Based on the foregoing, the model based exclusion rules may be expressed as follows:

For $\text{gapPct}_i < \text{gapPct}_{zip(i)}^{0.5\%}$, exclude observation i if $\text{gapPct}_i < \text{gapPct}_{US}^{2\%}$.  1.

For $\text{gapPct}_i > \text{gapPct}_{zip(i)}^{99.5\%}$, exclude observation i if $\text{gapPct}_i > \text{gapPct}_{US}^{98\%}$.  2.

$\text{gapPct}_{zip(i)}^{0.5\%} < \text{gapPct}_i < \text{gapPct}_{zip(i)}^{99.5\%}$, exclude observation i if ($\text{gapPct}_i < \text{gapPct}_{US}^{0.2\%}$) or ($\text{gapPct}_i > \text{gapPct}_{US}^{99.8\%}$).  3.

where the 0.5% and 99.5% percentiles of the small geographic area gap distribution for property i are denoted by $\text{gapPct}_{zip(i)}^{0.5\%}$ and $\text{gapPct}_{zip(i)}^{99.5\%}$ and subscript US is used to denote an entire sample.

FIG. 3 illustrates results obtained from applying the model-based rules to first and second sets of data. According to FIG. 3, the first set of data includes 17,583,192 observations and the second data set includes 12,103,264 observations.

FIG. 4 provides a comparison of the characteristics of the first and second data sets before and after the exclusion of the outlying data. As shown in FIG. 4, the means of $\ln(p/\hat{p})$ are close to zero for both the included and excluded samples, although the latter have slightly higher means than the former. The standard deviations of $\ln(p/\hat{p})$ are much higher for the excluded samples than those for the included samples (1.09 versus 0.147 for the first data set, and 0.65 versus 0.118 for the second data set). It is apparent to one skilled in the art that the particular values and percentages employed in the model based exclusion method may vary upward or downward without departing from the intended scope of this aspect of the invention.

The foregoing method of estimating real estate price indices or property values in accordance with the invention assumes that a robust and complete data set of sale prices, resale prices, and time periods is available. A complete set of indices covering all the data time periods can normally be estimated with a large data set, such as those associated with the repeat sales in a census region or a large metropolitan statistical area (MSA) e.g., Chicago. However, it is common for zip, county, or small MSA data sets to have insufficient sales data for estimation of the indices. Therefore, the inventive system also includes a method of filtering out and discarding data that is not useful for the estimating price indices or the present value of a property.

For example, a data set may contain three groups of properties with one group sold in periods 1 and 6, a second group sold in periods 2 and 3, and a third group sold in periods 1 and 5. The price change between periods 1 and 6, 2 and 3, and 1 and 5 can be estimated by simple average and the price change between periods 5 and 6 can also be estimated by subtracting the price change between periods 1 and 5 from that between periods 1 and 6. The price change for all other pairs of periods, however, such as 1 and 2, 1 and 3, and 1 and 4, etc., cannot be determined with the available data.

If it is desirable to estimate the home price index property values for period 6, then the data that is useful is that which is linked to sales in period 6 either directly or indirectly. In the foregoing example, only the data for the sales in periods 1, 5, and 6 would bear on the estimation of the price indices for period 6. The sales in period 1 bear on the estimation because it is directly linked to the sales in period 6. The sales in period 5 bear on the estimation because it is indirectly linked to the sales in period 6 as a result of both the period 5 and the period 6 sales being directly linked to the sales in period 1.

Therefore, if the price index for period T is to be determined, then it is desirable to select from the overall data set that data which affects the calculation of the price index for period T. The present invention, therefore, provides a method for identifying the time periods and the corresponding data that bear on the price index determination for a particular time period.

Figure 5:
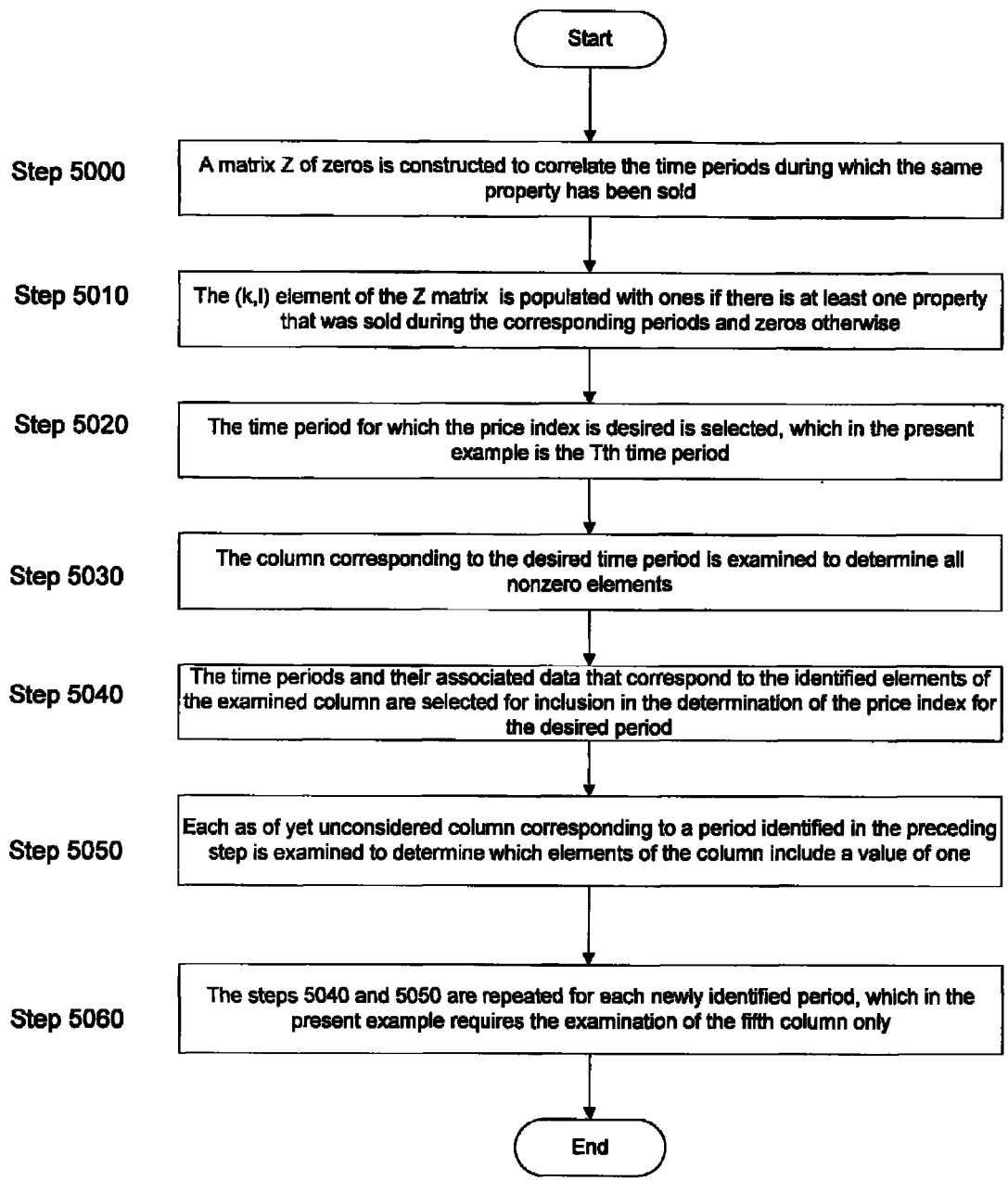
FIG. 5 illustrates the steps implemented in the data identification method of the present invention.

FIG. 5 illustrates the data identification method of the present invention. In Step 500, a matrix Z of zeros is constructed to correlate time periods during which the same property has been sold. If the data set contains N pairs of property sales that occurred during a span of T periods, then a T×T matrix (denoted by Z) is constructed with all elements initialized to zero, wherein each element of Z has a row and column coordinate (k,l). Each row and column represent a sales time period, counting top to bottom and left to right. Each (k,l) element in the matrix is used to indicate whether or not there are any properties that were sold during both period k and period l. In Step 501, the (k,l) element of the Z matrix is populated with ones if there is at least one property that was sold during the corresponding periods and zeros otherwise. Thus, a property sold in the first period and resold in the sixth period would require a 1 in the first row-sixth column position and the sixth row-first column position. If there are no properties that were sold in both periods k and l, the (k,l) element remains set to zero. The foregoing construction of Z always results in the creation of a symmetrical matrix in which all of the diagonal elements are zeros. Using the example data referenced above, the Z matrix would be:

$$\begin{bmatrix} 0 & 0 & 0 & 0 & 1 & 1 \\ 0 & 0 & 1 & 0 & 0 & 0 \\ 0 & 1 & 0 & 0 & 0 & 0 \\ 0 & 0 & 0 & 0 & 0 & 0 \\ 1 & 0 & 0 & 0 & 0 & 0 \\ 1 & 0 & 0 & 0 & 0 & 0 \end{bmatrix} \quad \text{Example 1}$$

In Step 502, the period for which the price index is desired is selected. If the estimation of price index is desired for the $T_{th}$ period, then each (k,l) element of the $T_{th}$ column that is equal to 1 designates the time periods for which the sales data is to be included for the determination of value. In Step 503, the $T_{th}$ column is examined to determine all nonzero elements. For example, if the $T_{th}$ period is the sixth ($6^{th}$) period in the example, then the sixth column is examined to determine which elements of the column include a 1.

In Step 504, the time periods and their associated data that correspond to the identified elements of the examined column is selected for inclusion in the determination of the price index for the desired $T_{th}$ period. In the above example, the first element in the sixth column, k=1 and l=6, is the only element that contains a 1. As a result, the sales for periods 1 and 6 are included for the determination of the price index for period 6.

In Step 505, each as of yet unconsidered column corresponding to a period identified in the preceding step is examined to determine which elements of the column include a value of one. With reference to the example, this step results in the examination of the first column only, because periods 1 and 6 have been identified and the sixth column has already been examined.

The next column to be examined is the first column. Examination of the first column reveals that only the fifth element in the first column, k=5 and l=1, and the sixth element, k=6 and l=1, contain a 1. This indicates that sales data for the first, fifth, and sixth periods is to be included in the price index determination for the sixth period. The first and sixth periods, having been previously identified however, are excluded from being re-identified. Thus, the fifth period is the only newly identified period for inclusion of sales data.

In Step 506, the procedures of steps 504 and 505 are repeated for each newly identified period, which in the present example requires the examination of the fifth column only. Application of Step 505 to the fifth column of the example matrix results in the re-identification of the previously identified first and fifth time periods. As a result Step 505 does not identify any new time periods for inclusion of sales data in the example provided.

The cycle of Step 504-506 is continued until there are no new additional periods identified. Using the data in the example, the foregoing process produces the expected result; data for the first, fifth, and sixth periods is included for the determination of the price index for period six. The sales data for the periods that are identified to be of interest may then be used in the three-stage determination described above either as modified by the first aspect of the present invention or as unmodified (i.e., the original Case and Shiller method).

After the index is estimated, it is common to find that the indices for some time periods are not estimated due to a complete lack of data for those time periods. When the data are available but insufficient, the estimated indices tend to be volatile and unreliable. To address these issues, the inventive method also includes an index exclusion and in-filling method to obtain an index series for a lower geographic level using that of a higher geographic level. The method is implemented by first establishing an exclusion criterion to exclude the periods for which the indices are deemed unreliable and then filling in price indices, predicted for a particular geographic region for a relatively smaller geographic area, wherein both the indices for the higher and lower geographic areas used in the in-filling method may be subjected to the index exclusion criterion.

To ensure the reliability of an index estimator for a period, a frequency measure and a standard error measure combination is developed to determine if the index estimates should be excluded before being used for in-filling. The frequency measure and standard error measure are described in a copending U.S. application Ser. No. 11/653,984, which is a continuation of application Ser. No. 10/328,162, which was filed on Dec. 26, 2002 and is entitled, Efficient Computation Method and Apparatus For Determining and Reporting a Real Estate Price Index, and incorporated by reference. According to a preferred embodiment of the invention, the frequency measure is provided by the diagonal elements of the inverse of the X' X matrix, where X is the design matrix representing the regressors of the first stage regression. Each row of the X matrix represents a pair of sales and each column a time period. The entries of the X matrix for each row are set to zeros except that the column for the period of the first sale is set to −1 and that for the second sale positive 1. The period with maximum sales frequency is chosen as the base period to construct the X matrix (i.e., excluded from the X matrix).

The X' X matrix can be determined as follows so as to avoid the need of constructing the large X matrix. It is recognized that X' X is a (T−1)×(T−1) matrix in which each element can be located with an (x, y) coordinate for which x=(row number) and y=(column number), and in which T represents the total number of sale time periods. The X' X matrix can be expressed as:

$$X'X = \sum_{i=1}^{N} (X_i' X_i) \quad \text{Equation 3}$$

$$= \sum_{(t_1, t_2)} n_{(t_1, t_2)} X'_{(t_1, t_2)} X_{(t_1, t_2)}$$

where $X_i$ is a (T−1)×1 matrix of the values of the independent variables for the ith pair of sales, $X_{(t_1,t_2)}$ is a (T−1)×1 matrix of the values of the independent variables for the observations with the first sales in $t_1$ and the second sales in $t_2$, and is the number of observations for which the first sales occur in $t_1$ and the second sales (i.e. resales) occur in $t_2$. Presuming the ith pair of sales occurred in periods $t_1$ and $t_2$ ($t_2 > t_1, t_2 \ne T$); then all of the elements of the $X'_i X_i$ matrix are zeros except for the (x, y)=($t_1,t_2$) and (x, y)=($t_2,t_1$) elements, which equal −1, and the (x, y)=($t_1, t_1$) and (x, y)=($t_2,t_2$) diagonal elements, which equal 1. If $t_2$=T, then all of the elements of $X'_i X_i$ are zeros except for the ($t_1,t_1$) diagonal entry, which equals 1. By summing up all the N pairs of sales, it can be shown that X' X is a symmetric matrix in which the ($t_1,t_2$) off-diagonal entry of X' X is equal to $-n_{(t_1,t_2)}$, and the (x,y) diagonal element of X' X (where x=y) equals the total number of sales that occurred in the time period t=x=y.

Based on the foregoing, X' X can be determined with the following steps:

1. Initialize a T×T matrix (denoted by W) with zeros wherein each element of W has a row and column coordinate of (x, y).
2. For each pair of periods $t_1$ and $t_2$, add $-n_{t_1,t_2}$ to the (x, y) elements of W for which (x=$t_1$, y=$t_2$) and for which (x=$t_2$, y=$t_i$).
3. Sum up all of the values in each column and place the negative of the sum at the corresponding diagonal element (where x=y) for the column, denote the matrix by F.
4. Remove the row and column for the base period from W to yield the X' X matrix.

The frequency measure of diag$\{(X' X)^{-1}\}$ can be viewed as an improvement to the simple frequency of sales for each time period in that the latter is a one-dimensional measure while the new measure is two-dimensional. The new frequency measure takes into consideration the link of sales periods to the base period among all the properties. Based on the diag$\{(X' X)^{-1}\}$ measure, direct link to the base period is assigned higher frequency than indirect link. The less indirect the link, the less frequency is assigned based on the new measure.

The standard error of the log index estimators in the first stage regression is $(X' X)^{-1} \sigma_\epsilon^2$, where $\sigma_\epsilon^2$ is the variance of the error term. The standard error of the log index estimators in the third stage regression is $[(X'_w X_w)^{-1} \sigma_{\epsilon_w}^2]^{1/2}$, where $X_w$ is the X matrix multiplied by the weight (i.e., the inverse of the predicted dispersion) and $\sigma_{\epsilon_w}^2$ is the variance of the error term of the weighted regression.

Combinations of the frequency measure diag$\{(X' X)^{-1}\}$ and the standard error in the first or third stage of the Case-Shiller type method are used to determine the index exclusion criterion that, in conjunction with the index in-filling method as described below, achieves the best mark-to-market results by testing a repeat sale data sample. Based on the combination of the new frequency measure diag$\{(X' X)^{-1}\}$ and the standard error of the log index in the first stage regression, the thresholds that achieve the best mark-to-market results are 1/12 for diag$\{(X' X)^{-1}\}$ and 0.05 for $[(X' X)^{-1} \sigma_\epsilon^2]^{1/2}$. The index for a period is excluded if the corresponding element of diag$\{(X'X)^{-1}\}$ is greater than the threshold (1/12) or the corresponding element of the standard error $[(X'X)^{-1} \sigma_\epsilon^2]^{1/2}$ is greater than the threshold (0.05). It is understandable that the specific thresholds for the index exclusion criteria may vary with the selected sample in application and the best criteria can always be determined by using the methods described in this invention. It is also expected that combinations of the frequency measure diag$\{(X'X)^{-1}\}$ and the standard error of the log index in the third stage regression will achieve further improved results in terms of mark-to-market prediction accuracy.

The filling-in procedure is used to infer the a lower geographic level index such as zip code-based index for the time periods for which there is insufficient data by using higher level indices, such as county, MSA, state, regional, and national level indices. FIGS. 6 and 7 illustrate examples of how price indices can be filled in for an assumed two index series for the same time duration, one for the county level and the other for the MSA level. According to the example, the indices for some of the time periods are missing. For each period with a missing county price index, the index can be inferred using the MSA index, provided that it exists. The county index may be denoted at time t by C, and the MSA index may be denoted at time t by $M_t$. The county index can be inferred using forward estimation in accordance with the expression:

$$C_t^f = \frac{M_t C_s}{M_s} \quad s < t \qquad \text{Equation 4}$$

or backward estimation in accordance with the expression:

$$C_t^b = \frac{M_t C_k}{M_k} \quad t < k \qquad \text{Equation 5}$$

where s and k are the most recent periods before and after time t, respectively, for which both the county and MSA indices are available. The average of the forward and backward estimation is used as the inferred county index for the period t.

In FIG. 6, the zip code, county, and MSA indices for periods one to seven are provided in the first, second, and third column, respectively. Given the three levels of indices (zip code, county, and MSA), the MSA indices may be used first to fill in county indices, and then the filled-in county indices may be used to fill in zip code indices. Applying the procedure described above, FIG. 7 illustrates the following indices that are obtained.

The filling in procedure may be followed when indices are known for any of a combination of the following levels: the national (US) level, census region (Regional) level, State level, MSA level, County level, and zip code (Zip) level. When indices are known for higher levels, the missing indices will be filled in for the lower levels.

It will be apparent to those skilled in the art that variations and modifications of the present invention can be made without departing from the scope or spirit of the invention. For example, the program language and code selected to implement the aspects of the present invention may be varied without departing from the intended scope of the claims. Further, the computer hardware selected to implement the aspects of the present invention may also be varied without departing from the intended scope of the claims. Thus, it is intended that the present invention cover all such modifications and variations of the invention, provided they come within the scope of the appended claims and their equivalents.

What is claimed is:

1. A computer-implemented method for determining a real estate price index based on a repeat sales model, the method comprising the steps of:
    a processor executing in a first stage regression, regressing the difference in a log price of a second sale minus a log price of a first sale for a property on a set of dummy variables, each log price representing a time period except a base period;
    a processor executing in a second stage regression, using a quadratic formula to model, and estimate a dispersion of residual values with respect to time interval and determining a modified dispersion by determining a minimum dispersion value corresponding to a first point in time and a maximum dispersion value corresponding to a second point in time, wherein the modified dispersion is configured such that the dispersion value is not below zero at times less than, the first point in time and is held at the maximum dispersion value at times greater than the second point in time;
    a processor executing in a third stage regression, repeating the first stage regression using the inverse of the square root of fitted values from the quadratic formula from the second stage regression as weights;
    determining the real estate price index resulting from the first, second and third stage regressions; and
    storing the determined real estate price index in a computer memory.

2. The method of claim 1, wherein the second stage excludes those observations that have zero residuals in the first-stage regression due to limited data availability.

3. The method of claim 2, further comprising the step of identifying the zero residuals by determining (1) if the first-stage residual is zero, and (2) if there is only one observation for a pair of sale and resale time points, and (3) if the diagonal element for the first sale of the inverse of the frequency matrix with the row and column for the second sale excluded is equal to one.

4. The method of claim 2, further comprising the step of identifying the zero residuals by determining if the first-stage residual is zero.

5. The method of claim 2, further comprising the step of identifying the zero residuals by determining if there is only one observation for a pair of sale and resale time points.

6. The method of claim 1, wherein determining the minimum residual value includes selecting the minimum positive value that is a low value that is assured to be more than a small amount greater than zero.

7. The method of claim 1, wherein determining the minimum residual value includes setting the minimum dispersion value to equal one-half of a second positive dispersion value that is calculated from the quadratic formula.

8. The method of claim 1, wherein determining the minimum dispersion value includes setting the minimum dispersion value to equal a second positive dispersion value that is calculated from the quadratic formula.

9. The method of claim 1, further comprising:
    eliminating corrupt portions of data used to determine price indices by using a model based process to eliminate an outlying data before estimating the real estate price index.

10. The method of claim 9, wherein eliminating corrupt portions of data further comprises:

determining a position of each property in a prediction gap distribution for a corresponding geographic area and in a gap distribution for an entire sample; and excluding a data value if the data value falls within at least one predefined criterion.

11. The method of claim 10, wherein eliminating corrupt portions of data further comprises:

assuming that a data value is the outlying data if a prediction gap is at a tail end of the gap distribution.

12. The method of claim 10, wherein excluding a data value further comprises excluding the data value if it has a prediction gap at a predetermined tail end of a small geographic area gap distribution and also at a less-extreme tail end of the entire sample gap distribution.

13. The method of claim 10, wherein excluding a data value further comprises excluding the data value if the prediction gap for the data value is not at a predetermined tail end of a small geographic area gap distribution but at a far tail end of the entire sample gap distribution.

14. The method of claim 1, wherein estimating the real estate price index comprises obtaining an index series for a relatively small geographic area by using the index series of a relatively large geographic area.

15. The method of claim 14, wherein obtaining the index series for the relatively small geographic area comprises:

establishing an exclusion criterion to exclude periods for which indices are deemed unreliable;

developing a frequency measure and a standard error measure combination to determine if an index estimate should be excluded;

filling in price indices predicted for a geographic region for the relatively small geographic area; and executing the indices for the geographic region and the relatively small geographic area against the exclusion criterion.

16. The method of claim 1, further comprising:

determining an estimated real estate value using the determined price index and, displaying the estimated real estate value.

17. A computer-implemented method for obtaining an index series based on a repeat sales model, the method comprising the steps of:

eliminating corrupt portions of data used to determine price indices;

a processor executing in a first stage regression, regressing a difference in a log price of a second sale minus a log price of a first sale for a property on a set of dummy variables, each log price representing a time period except a base period;

eliminating the observations with zero residuals for estimating the dispersion function;

a processor executing in a second stage regression, using a quadratic formula to model and estimate a dispersion of residual values with respect to time interval and determining a modified dispersion by determining a minimum dispersion value corresponding to a first point in time and a maximum dispersion value corresponding to a second point in time, wherein the modified dispersion is configured such that the dispersion value is not below zero at times less than the first point in time and is held at the maximum dispersion value at times greater than the second point in time;

repeating the first stage regression using the inverse of the square root of fitted values from the quadratic formula from the second stage regression as weights;

identifying and selecting the time periods and associated data for estimating a price index that covers a particular time period;

excluding the time periods for which the index values are determined to be unreliable;

obtaining an index series for a relatively small geographic area by using an index series of a relatively large geographic area; and storing the obtained index series for the relatively small geographic area in a computer memory.

18. The method of claim 17, further comprising:

determining an estimated real estate value using the index series for the relatively small geographic area and displaying the estimated real estate value.

19. A computer system for determining a real estate price index based on a repeat sales model, the system comprising:

a memory; and a processor, for executing program instructions stored in the memory, the program instructions executed to provide operations comprising:

in a first stage regression, regressing the difference in a log price of a second sale minus a log price of a first sale for a property on a set of dummy variables, each log price representing a time period except a base period;

in a second stags regression, using a quadratic formula to model and estimate a dispersion of residual values with respect to time interval and determining a modified dispersion by determining a minimum dispersion value corresponding to a first point in time and a maximum dispersion value corresponding to a second point in time, wherein the modified dispersion is configured such that the dispersion value is not below zero at times less than the first point in time and is held at the maximum dispersion value at times greater than the second point in time;

in a third stage regression, repeating the first stage regression using the inverse of the square root of fitted values from the quadratic formula from the second stage regression as weights;

determining the real estate price index resulting from the first, second and third stage regressions; and storing the determined real estate price index in a computer memory.

20. The system of claim 19, wherein the second stage excludes those observations that have zero residuals in the first-stage regression due to limited data availability.

* * * * *